(12) United States Patent
Ji et al.

(10) Patent No.: US 12,460,681 B2
(45) Date of Patent: Nov. 4, 2025

(54) THREE BALL PIN-TYPE COUPLING AND STEERING MECHANISM

(71) Applicant: Schaeffler Technologies AG & Co. KG, Herzogenaurach (DE)

(72) Inventors: Yandong Ji, Shanghai (CN); Liuqing Yan, Shanghai (CN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 482 days.

(21) Appl. No.: 18/018,095

(22) PCT Filed: Jul. 28, 2020

(86) PCT No.: PCT/CN2020/105259
§ 371 (c)(1),
(2) Date: Jan. 26, 2023

(87) PCT Pub. No.: WO2022/021081
PCT Pub. Date: Feb. 3, 2022

(65) Prior Publication Data
US 2023/0279906 A1 Sep. 7, 2023

(51) Int. Cl.
*F16D 3/205* (2006.01)
*B62D 5/04* (2006.01)
*F16C 33/44* (2006.01)
*F16D 3/202* (2006.01)

(52) U.S. Cl.
CPC ......... *F16D 3/2055* (2013.01); *B62D 5/0421* (2013.01); *B62D 5/0454* (2013.01); *F16D 2003/2023* (2013.01); *F16D 2300/22* (2013.01)

(58) Field of Classification Search
CPC ........... F16D 3/2055; F16D 2003/2023; F16D 2300/22; B62D 5/0421; B62D 5/0454
See application file for complete search history.

(56) References Cited

U.S. PATENT DOCUMENTS

| 5,061,223 | A | 10/1991 | Kadota et al. |
| 6,074,303 | A | 6/2000 | Perrow et al. |

FOREIGN PATENT DOCUMENTS

| CN | 101749331 | 6/2010 |
| CN | 103249957 | 8/2013 |
| CN | 103967955 | 8/2014 |
| CN | 108700127 | 10/2018 |

(Continued)

*Primary Examiner* — Tinh Dang
(74) *Attorney, Agent, or Firm* — Volpe Koenig

(57) ABSTRACT

A three ball pin-type coupling, having a first connector and a second connector which are non-rotatably connected. The first connector includes a three shaft pin assembly, raceway assemblies and a cage assembly. The three shaft pin assembly includes a shaft and three ball rings which surround the shaft and are arranged at intervals in the circumferential direction of the shaft. There are three raceway assemblies. Each ball ring is connected to a raceway assembly. The cage assembly defines the position of the raceway assemblies in the circumferential direction. The raceway assemblies can provide elastic force between the ball ring and the cage assembly. When the ball ring displaces relative to the cage assembly in the circumferential direction, the two sides of the raceway assemblies in the circumferential direction remain abutted against the cage assembly. A steering mechanism is also provided.

20 Claims, 6 Drawing Sheets

(56) References Cited

FOREIGN PATENT DOCUMENTS

| | | | | |
|---|---|---|---|---|
| CN | 110100108 A | * | 8/2019 | ........... F16D 3/2055 |
| CN | 111306205 | | 6/2020 | |
| CN | 210978263 | | 7/2020 | |
| DE | 102007059378 B4 | | 2/2015 | |
| FR | 2475657 A1 | * | 8/1981 | ........... F16D 3/2055 |
| JP | H03168416 A | | 7/1991 | |
| JP | 2004125045 A | | 4/2004 | |
| JP | 2005321033 A | | 11/2005 | |
| JP | 2005344737 A | | 12/2005 | |
| WO | 2016152667 A1 | | 9/2016 | |

\* cited by examiner

THREE BALL PIN-TYPE COUPLING AND STEERING MECHANISM

CROSS-REFERENCE TO RELATED APPLICATIONS

This application is the U.S. National Phase of PCT Appln. No. PCT/CN2020/105259, filed Jul. 28, 2020, the entire disclosure of which is incorporated by reference herein.

TECHNICAL FIELD

The present disclosure relates to the field of couplings, and in particular to three ball pin-type couplings for a steering mechanism of a vehicle.

BACKGROUND

Steering mechanisms of vehicles, and especially electric power steering mechanisms, generally use worm gear and worm transmission to amplify the torque of the motor and drive racks to complete steering. Such steering mechanisms include for example column-type and double-pinion steering mechanisms.

One of commonly used worm systems in the above-mentioned steering mechanisms connects the output shaft of the motor to the worm shaft as a male shaft and a female shaft through a coupling, thereby realizing the transmission of motor torque. The torque of the motor will be further transmitted to the worm gear and worm which are close to and engaged with each other, and thereby be amplified so as to drive other components in the entire steering system.

The supporting portion of the described worm system comprises a self-aligning bearing on one side of the worm and a deep groove ball bearing on the other side. In order to ensure the continuous and stable engagement of the worm gear and worm system, a spring is arranged along the vertical direction of the axis of engagement of the worm gear and worm at the part of the worm where the deep groove ball bearing is provided.

For the worm gear and worm having for example a transmission ratio of 21, if the motor torque is 5 Nm, the torque transmitted to the worm gear through the coupling is about 100 Nm (taking into account the efficiency loss of the worm gear and worm during the torque transmission process), and therefore the driving force against racks is about 10 kN, which is used for driving wheels to complete the steering action. Engineering plastics are generally used as the manufacturing material of the contact surface between the worm gear and the worm for a noiseless torque transmission. However, this plastic contact surface may become worn after a long-term use, which causes the axis of the worm shaft to be subjected to an offset adjustment at a certain angle (the maximum magnitude of the offset is usually +/−1.5°) under the action of the spring force so as to ensure that the worm gear and worm have substantially the same engagement quality before and after a long-term use.

However, as the output torque of the motor increases (for example from 5 Nm to 8 Nm) to be adapted to driving vehicles with higher loads, it results in a greater surface wear of the plastic surface of the worm gear after a long-term use, which in turn makes it necessary for the worm to have a larger axis offset (compensation) angle.

While the self-aligning bearing located on one side of the worm may achieve a larger self-aligning angle easily, the coupling located between the motor and the worm usually has a limited self-aligning capability. Once the offset angle of the axis of the worm outruns the designed compensation ability of the coupling, the system is prone to experience a series of problems such as vibration noise, torque transmission hysteresis, and backlashes resulting from mating tooth profile wear.

Therefore, there is an urgent need to expand the compensation range of the self-alignment angle of the coupling while ensuring torsional stiffness.

SUMMARY

The purpose of the present disclosure is to provide a three ball pin-type coupling and a steering mechanism in order to overcome or at least alleviate the foregoing disadvantages of the prior art.

According to a first aspect of the present disclosure, a three ball pin-type coupling is provided, the three ball pin-type coupling comprising a first connector and a second connector which are non-rotatably connected, wherein the first connector comprises a three shaft pin assembly, raceway assemblies and a cage assembly;

the three shaft assembly comprises a shaft and three ball rings which surround the shaft and are arranged at intervals in a circumferential direction of the shaft; there are three raceway assemblies; each ball ring is connected to one of the raceway assemblies; the cage assembly defines the position of the raceway assemblies in the circumferential direction;

the raceway assemblies can provide elastic force between the ball ring and the cage assembly; and when the ball ring displaces relative to the cage assembly in the circumferential direction, two sides of the raceway assembly in the circumferential direction remain abutted against the cage assembly.

In at least one embodiment, the raceway assemblies comprise raceway frames, inner raceways, outer raceways and elastic members;

each of the raceway frames is provided with two inner raceways and two outer raceways; two of the inner raceways are spaced apart to form a ball ring mounting portion therebetween; one of the outer raceways is mounted on a side of each of the inner raceways away from the ball ring mounting portion; one inner raceway and one outer raceway located on the same side of the ball ring mounting portion form a raceway pair;

the elastic member is at least partially provided between the inner raceway and the outer raceway; and the elastic member abuts against the inner raceway and the outer raceway of each of the raceway pairs.

In at least one embodiment, when the ball ring is located right in the middle of two of the outer raceways, the elastic member is squeezed by the inner raceway and the outer raceway and is deformed elastically thereby.

In at least one embodiment, the stiffness coefficient of the elastic member changes during elastic deformation of the elastic member.

In at least one embodiment, a portion of the elastic member between the inner raceway and the outer raceway is at least partially in a wave shape.

In at least one embodiment, the elastic member is U-shaped as a whole; the elastic member includes a connecting portion and two wave-shaped springs connected with two ends of the connecting portion; and two of the wave-shaped springs are inserted between the inner raceway and the outer raceway of one of the raceway pairs, respectively.

In at least one embodiment, a side of the inner raceway facing the ball ring mounting portion is partially recessed to form a spherical concave surface, which is part of a spherical surface and is in contact with the ball ring.

In at least one embodiment, a side of the outer raceway facing away from the ball ring mounting portion is partially recessed to form a curved surface in contact with the cage assembly.

In at least one embodiment, the cage assembly includes a cage body and balls;

the cage body includes an annular portion and three arms connected with the annular portion; the arms extend along an axial direction of the annular portion; two sides of the arms in the circumferential direction are formed with several notched ball pockets;

the balls are accommodated in the ball pockets, and are capable of rolling relative to the ball pockets within the ball pockets;

each of the arms is inserted between two of the raceway assemblies; and the balls abut against the raceway assemblies.

In at least one embodiment, a middle portion of each of the arms, which is located between two rows of the ball pockets in the circumferential direction, is recessed radially and inwardly to form an arm recess.

In at least one embodiment, the second connector includes a tubular sliding sleeve having a first end in the axial direction connected to the first connector;

an inner cavity of the sliding sleeve includes three projecting ribs in the axial direction near the first end projecting radially and inwardly and spaced apart in the circumferential direction; the projecting ribs extend in the axial direction so as to form a groove between every two adjacent projecting ribs;

the arms are aligned with the projecting ribs in the circumferential direction; the balls abut against the projecting ribs; and each of the raceway assemblies is received in one of the grooves.

In at least one embodiment, two sides of each of the projecting ribs in the circumferential direction are each formed with a recessed cambered surface, and the balls abut against the cambered surfaces.

In at least one embodiment, a hook portion projecting outwardly in a radial direction of the annular portion is formed at the end of the arm away from the annular portion;

the hook portion hooks the projecting rib to prevent the cage assembly from disengaging from the first end.

In at least one embodiment, an outer circumferential portion of the annular portion includes several annular projections projecting radially and outwardly, and the annular projections abut against an end face of the sliding sleeve at the first end to limit the cage assembly in the axial direction.

In at least one embodiment, the inner cavity of the sliding sleeve does not have the projecting ribs at a second end away from the first end in the axial direction;

the second connector further includes a vibration damping assembly mounted on the second end non-rotatably relative to the sliding sleeve; the vibration damping assembly extends at least partially into the inner cavity of the sliding sleeve;

the shaft abuts against the vibration damping assembly, an axial end of the shaft close to the vibration damping assembly forms a spherical surface; and a portion of the vibration damping assembly that is in contact with the shaft is shaped as a spherical surface.

In at least one embodiment, the vibration damping assembly includes an adapter, a cup housing and a buffer;

the adapter and the sliding sleeve are non-rotatably connected to one another;

the cup housing is connected to the adapter; the buffer is provided between the cup housing and the adapter;

a portion of the shaft that is in contact with the vibration damping assembly is located at the cup housing; and a portion of the cup housing that is in contact with the shaft forms a recessed ball concave portion in the shape of a spherical surface.

In at least one embodiment, an inner circumferential portion of the adapter forms a splined hole.

In at least one embodiment, the adapter is embedded in the inner cavity of the sliding sleeve;

a middle portion of the end face of the adapter facing the shaft forms a boss by projecting towards the shaft; and the cup housing is sleeved on the boss in such a way that the cup housing is axially movable relative to the boss.

In at least one embodiment, when the buffer is not compressed, there is a gap between the cup housing and the end face of the adapter facing the shaft.

According to a second aspect of the present disclosure, a steering mechanism comprising a motor, a coupling and a worm gear and worm assembly is provided, wherein the coupling is a three ball pin-type coupling according to the present disclosure;

the first connector of the three ball pin-type coupling and a worm of the worm gear and worm assembly are non-rotatably connected; and the second connector of the three ball pin-type coupling and an output shaft of the motor are non-rotatably connected.

The three ball pin-type coupling according to the present disclosure can reduce vibration during the transmission process, and can effectively transmit torque in the presence of axial offset between transmission components.

The steering mechanism according to the present disclosure is not prone to experience reversing clearance and vibration shock while operating.

DETAILED DESCRIPTION

Exemplary embodiments of the present disclosure will be described below with reference to the drawings. It should be understood that the specific description is only used to teach those skilled in the art how to implement the present disclosure, and is neither intended to be exhaustive of all possible variations of the present disclosure nor to limit the scope of the present disclosure.

Figure 1:
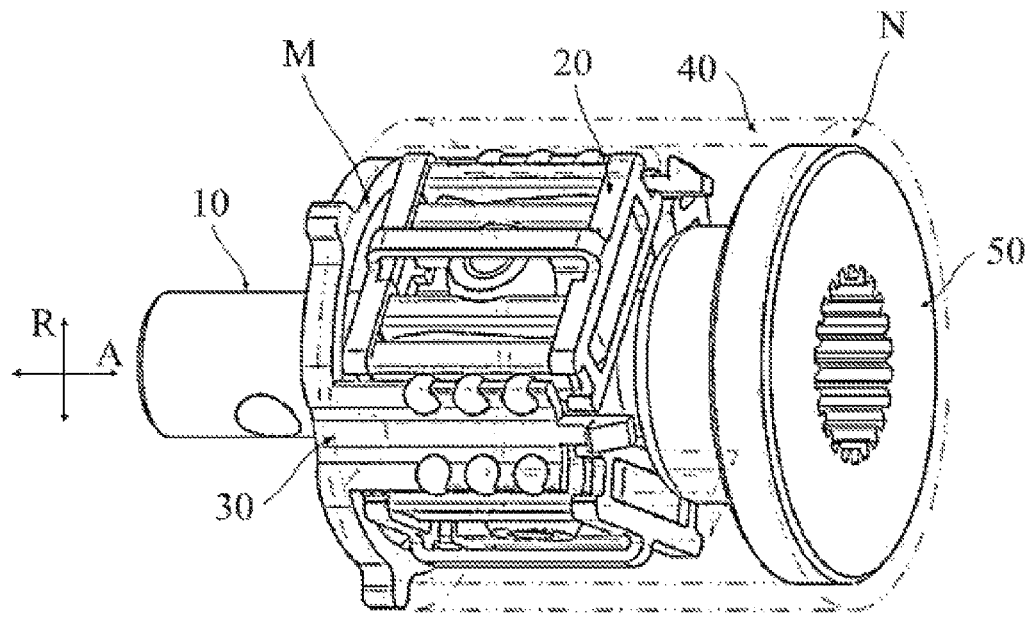
FIG. 1 is a schematic diagram of a three ball pin-type coupling according to one embodiment of the present disclosure.
Figure 2:
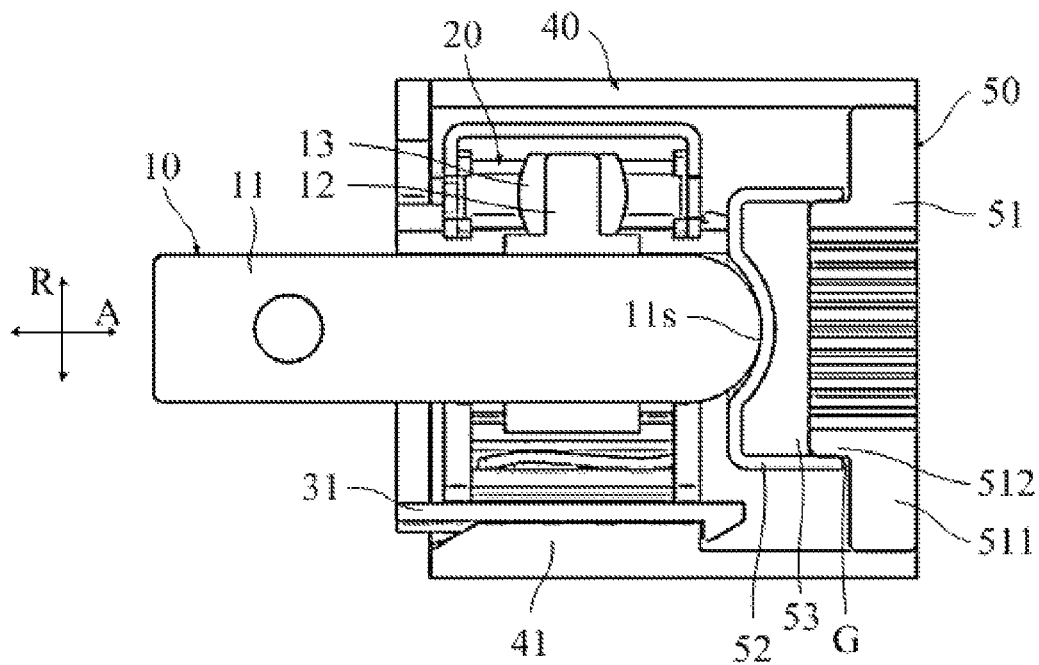
FIG. 2 is a cross-sectional view of FIG. 1 along the axial direction.

Unless otherwise specified, with reference to FIGS. 1 and 2, A denotes the axial direction of a three ball pin-type coupling which coincides with the axial direction of a sliding sleeve 40; and R denotes the radial direction of the three ball pin-type coupling which coincides with the radial direction of the sliding sleeve 40.

A three ball pin-type coupling (hereinafter also referred to as a coupling) and a steering mechanism including the coupling according to the present disclosure are described with reference to FIGS. 1 to 15.

The steering mechanism according to the present disclosure comprises a motor, a three ball pin-type coupling and a worm gear and worm assembly, wherein the three ball pin-type coupling connects an output shaft of the motor and a worm in the worm gear and worm assembly such that torque of the output shaft can be transmitted to the worm.

With reference to FIGS. 1 and 2, the three ball pin-type coupling according to the present disclosure includes a first connector M and a second connector N which are connected in a torsion-free manner (non-rotatably connected), wherein the first connector M is configured to connect to the worm and the second connector N is configured to connect to the output shaft of the motor.

First of all, the first connector M according to one embodiment of the present disclosure is described with reference to FIGS. 1 to 11.

The first connector M comprises a three shaft pin assembly 10, raceway assemblies 20 and a cage assembly 30.

The three shaft pin assembly 10 comprises a shaft 11, a three-pin joint 12 and ball rings 13.

Figure 3:
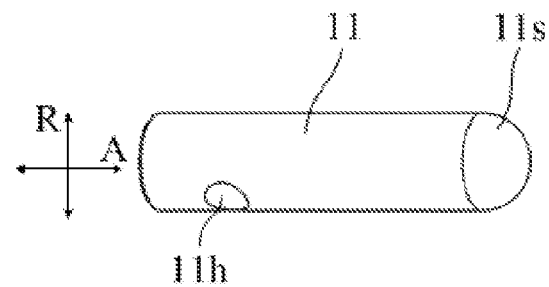
FIG. 3 is a structural schematic diagram of the shaft 11 in FIG. 2.

The shaft 11 is configured to connect with the worm in a torsion-free manner. With reference to FIG. 3, in the present embodiment, a first end (the left end in FIG. 3) of the shaft 11 is provided with a hole 11*h*, which penetrates the shaft 11 in a radial direction R and is used for mating with a pin. For example, one end of the worm is provided with an inner hole extending in the axial direction and a pin hole which intersects the inner hole and extends in the radial direction. The first end of the shaft 11 may be inserted into the inner hole and the pin is used to pass through the pin hole and the hole 11*h*, thereby connecting the shaft 11 and the worm together in a torsion-free manner.

A second end (the right end in FIG. 3) of the shaft 11 has a spherical surface 11*s*, and the spherical surface 11*s* is used to fit with the vibration damping assembly 50 (described in detail below) to achieve the function of universal adjustment.

Figure 4:
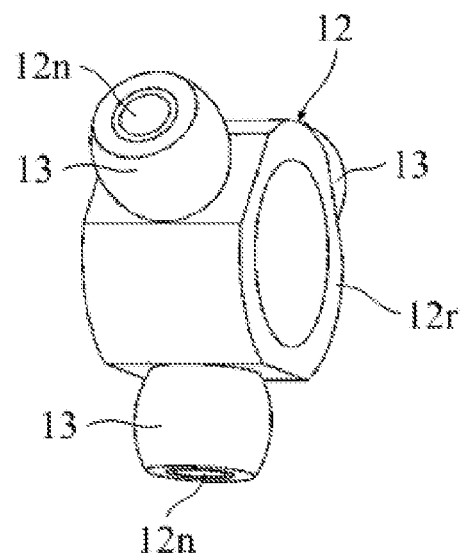
FIG. 4 is a structural schematic diagram of the three-pin joint 12 and the ball rings 13 in FIG. 2.

With reference to FIGS. 2 and 4, the three-pin joint 12 comprises a ring 12*r* located in a middle portion and three journals 12*n* connected to an outer circumferential portion of the ring 12*r* and extending in the radial direction of the ring 12*r*. Preferably, the three journals 12*n* are uniformly distributed at intervals in the circumferential direction of the ring 12*r*. One of ball rings 13 is sleeved on the outer circumference of each journal 12*n*, and the outer circumferential surface of the ball ring 13 is part of a spherical surface. It should be understood that a rolling body may be provided between the journal 12*n* and the ball ring 13. The three-pin joint 12 is sleeved on the outer circumference of the shaft 11 and is connected to the shaft 11 in a torsion-free manner by for example interference fit.

With reference to FIG. 1, each ball ring 13 is connected to one raceway assembly 20, and three raceway assemblies 20 are limited in the axial direction A and in the circumferential direction of the shaft 11 by the cage assembly 30.

The raceway assemblies 20 are described with reference to FIGS. 5 to 9.

In the present embodiment, the raceway assembly 20 comprises a raceway frame 21, an inner raceway 22, an outer raceway 23 and an elastic member 24.

Figure 6:
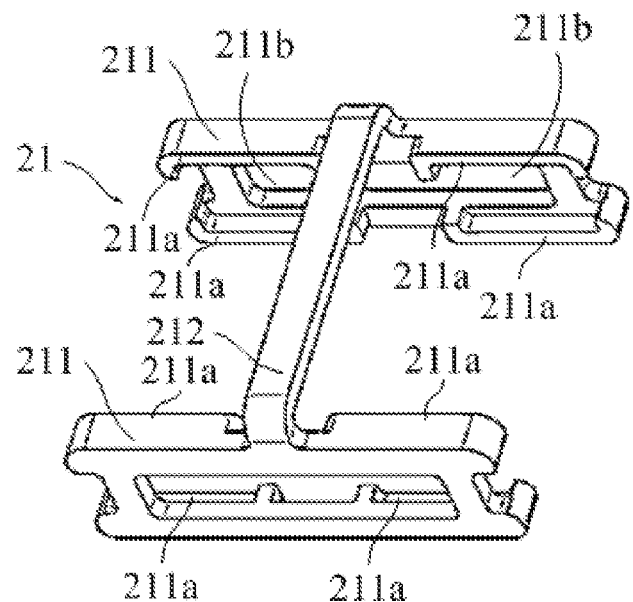
FIG. 6 is a schematic diagram of the raceway frame 21 of the raceway assembly 20 in FIG. 5.

With reference to FIG. 6, the raceway frame 21 comprises two side frames 211 that are substantially rectangular and a connecting rod 212 connecting the two side frames 211. The middle portion of the side frame 211 has a through hole penetrating in a direction the connecting rod 212 extends. Pocket edges 211*a* are convexly formed on opposite inner surfaces of the two side frames 211. Specifically, four pocket edges 211*a* are formed on one side frame 211 and are substantially C-shaped, the main body of the pocket edge 211*a* located at the middle portion of the C shape extends along a long edge of the side frame 211, and the four pocket edges 211*a* occupy substantially four corners of the side frame 211. C-shaped openings of two opposite pocket edges 211*a* on the two long edges of the side frame 211 are opposite to one another such that a pocket slot 211*b* is defined between the two pocket edges 211*a*. Each side frame 211 has two pocket slots 211*b* that are located on two sides of the connecting rod 212 respectively and used for mounting the inner raceway 22 and the outer raceway 23. The pocket slots 211*b* of the two side frames 211 located on the same side of the connecting rod 212 are opposite to one another for mounting a raceway pair.

Figure 5:
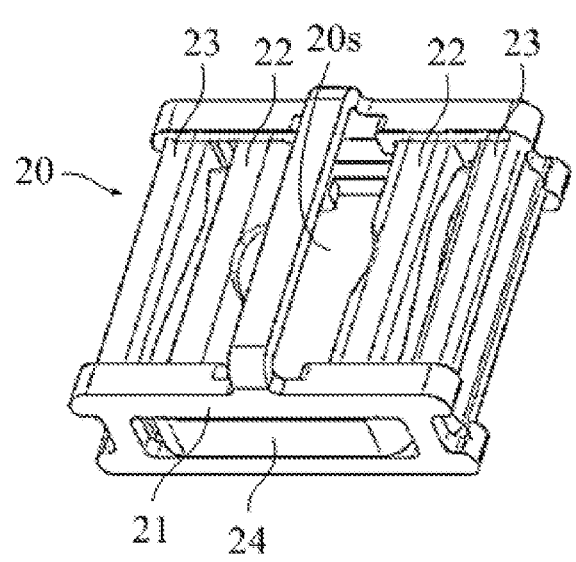
FIG. 5 is a structural schematic diagram of the raceway assembly 20 in FIG. 1.

At the same time, with reference to FIG. 5, one inner raceway 22 and one outer raceway 23 form one raceway pair, one raceway assembly 20 comprises two raceway pairs, the inner raceway 22 is provided on the inner side of the outer raceway 23 and is closer to the connecting rod 212, and two ends of both the inner raceway 22 and the outer raceway 23 extend into two pocket slots 211*b* respectively to connect to the raceway frame 21. The space between the two inner raceways 22 forms a ball ring mounting portion 20*s*, and the ball ring 13 can be embedded in the ball ring mounting portion 20*s*.

Figure 7:
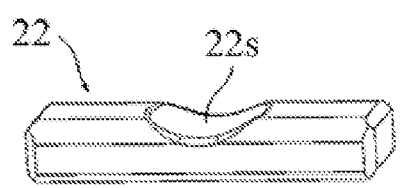
FIG. 7 is a schematic diagram of the inner raceway 22 of the raceway assembly 20 in FIG. 5.

At the same time, with reference to FIG. 7, opposite faces of the two inner raceways 22 are partially recessed to form a concave surface 22*s*, which is preferably part of a spherical surface. When the ball ring 13 is embedded into the ball ring mounting portion 20*s*, the ball ring 13 is clamped by the two concave surfaces 22*s*. The ball ring 13 may swing in all directions within a small range relative to the concave surface 22*s*, but may not disengage from the raceway assembly 20, as the spherical surface of the ball ring 13 fits with the spherical surface of the concave surface 22*s*. The position of the raceway assembly 20 in the axial direction A and in the circumferential direction relative to the shaft 11 can be determined in such a way that the ball ring 13 fits with the two concave surfaces 22s of the raceway assembly 20, as the position of the ball ring 13 relative to the three-pin joint 12 (or the shaft 11) in the axial direction A and in the circumferential direction is determined.

Figure 9:
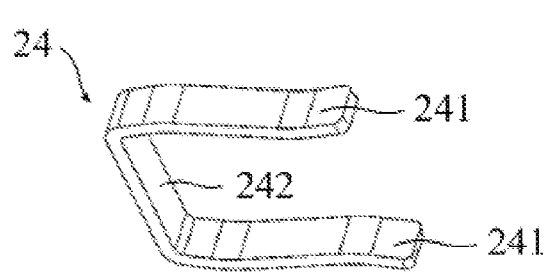
FIG. 9 is a schematic diagram of the elastic member 24 of the raceway assembly 20 in FIG. 5.

With reference to FIGS. 5 and 9, the elastic member 24 is substantially U-shaped, and it comprises a connecting portion 242 and two wave-shaped springs 241 connected to both ends of the connecting portion 242. The two wave-shaped springs 241 are inserted between the inner raceway 22 and the outer raceway 23 of one raceway pair, respectively, the connecting portion 242 passes through a hole in the middle portion of the side frame 211, and preferably the connecting portion 242 is completely accommodated in the hole in the middle portion of the side frame 211.

Both sides of the wave-shaped spring 241 abut against the inner raceway 22 and the outer raceway 23, respectively. Preferably, in the initial state (when the coupling is not mounted to the motor shaft and the worm, and the ball ring 13 is located right in the middle of the two outer raceways 23), the wave-shaped spring 241 is deformed slightly under slight compression of the inner raceway 22 and the outer raceway 23. At this time, the elastic force produced by the wave-shaped spring 241 presses the inner raceway 22 and the outer raceway 23 to the contour edge of the pocket slot 211b, that is, the inner raceway 22 and the outer raceway 23 abut against the pocket edges 211a, respectively, to fill the pocket slots 211b in the direction in which the long edges of the side frames 211 extend.

During the operation of the steering mechanism, the ball ring 13 presses one of the inner raceways 22 in a certain direction (this state will be described hereinafter), causing the wave-shaped spring 241 to (further) deform under compression.

The wave-shaped spring 241 exhibits a wave shape and falls under the category of a nonlinear spring, that is the stiffness coefficient (also called the elastic coefficient) of the wave-shaped spring 241 varies when the wave-shaped spring is deformed under compression. Accordingly, as the wave-shaped spring 241 deforms to varying degrees, the force applied by the wave-shaped spring 241 to the inner raceway 22 and the outer raceway 23 is also nonlinear, and this is advantageous for maintaining a certain transmission stiffness.

Figure 8:
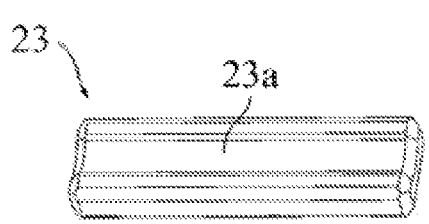
FIG. 8 is a schematic diagram of the outer raceway 23 of the raceway assembly 20 in FIG. 5.

With reference to FIGS. 5 and 8, the middle portion of the side of the outer raceway 23 away from the ball ring mounting portion 20s is recessed to form a curved surface 23a which is in contact with balls 32 of the cage assembly 30 which will be described hereinafter.

Figure 10:
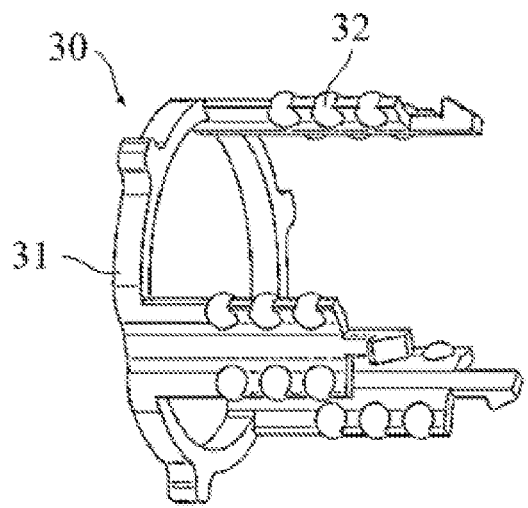
FIG. 10 is a schematic structure diagram of the cage assembly 30 in FIG. 1.
Figure 11:
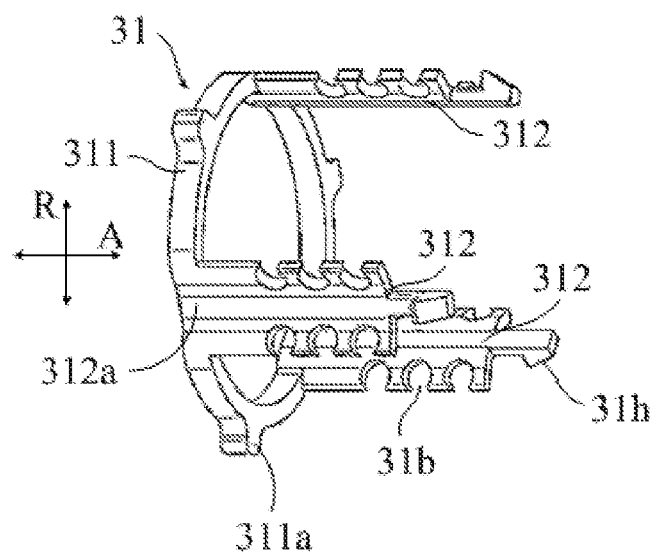
FIG. 11 is a structural schematic diagram of the cage body 31 in FIG. 10.

With reference to FIGS. 1, 10, and 11, the specific structure of the cage assembly 30 and its limitation on the raceway assembly 20 are described as follows.

The cage assembly 30 comprises a cage body 31 and balls 32. The cage body 31 comprises an annular portion 311 and three arms 312 connected to the annular portion 311, the three arms 312 being uniformly spaced apart in the circumferential direction of the annular portion 311 and extending in the axial direction of the annular portion 311. The arms 312 engage with the raceway assembly 20 as well as with projecting ribs 41 of the sliding sleeve 40 of the second connector N (further described hereinafter).

With reference to FIG. 11, each arm 312 is formed with two rows of notches on two sides in the circumferential direction of the annular portion 311, and each row of notches comprises several (three in the figure) ball pockets 31b in the shape of a large semicircle (a semicircle corresponding to a major arc).

With reference to FIG. 10, each ball pocket 31b accommodates a ball 32 which is preferably a steel ball made of steel. The balls 32 are floatably accommodated in the ball pockets 31b, that is, the balls 32 are capable of rolling in the ball pockets 31b without rolling out of the ball pockets 31b.

Referring again to FIG. 11, the middle portion of each arm 312 located between two rows of the ball pockets 31b in the circumferential direction is recessed radially and inwardly to form an arm recess 312a. A hook portion 31h projecting radially and outwardly is formed at an end of the arm 312 away from the annular portion 311. Preferably, the outer circumferential portion of the annular portion 311 also has three annular projections 311a projecting radially and outwardly which are located between two adjacent arms 312 in the circumferential direction. The arm recess 312a is configured to fit with the projecting rib 41 (described hereinafter) of the sliding sleeve 40 located at the second connector N to define a position between the first connector M and the second connector N in the circumferential direction; the hook portion 31h is configured to hook the projecting rib 41 to define a position between the first connector M and the second connector N in the axial direction A; and the annular projections 311a are configured to abut against an end face (described hereinafter) of a first end 401 of the sliding sleeve 40 in the axial direction A to define a position between the first connector M and the second connector N in the axial direction A.

Referring again to FIG. 1, with respect to the first connector M, one raceway assembly 20 is accommodated between two adjacent arms 312, and the balls 32 abut against the curved surface 23a of the outer raceway 23 of the raceway assembly 20. In addition, the raceway assembly 20 (specifically the raceway frame 21 of the raceway assembly 20) abuts against the cage body 31 of the cage assembly 30 in the axial direction A, such that the raceway assembly 20 is prevented from disengaging from the left side shown in FIG. 1.

At this point, the reader can understand how the three shaft pin assembly 10, the raceway assemblies 20, and the cage assembly 30 are connected to form an integral whole. The first connector M of the whole can transmit torque in the circumferential direction, in other words, the cage assembly 30 can transmit torque to the shaft 11 through the raceway assemblies 20, the ball rings 13, and the three-pin joint 12, and each component of the first connector M can absorb vibration during the process of transmitting torque to one another (described hereinafter).

Next, the second connector N according to the present disclosure and the connection relationship between the second connector N and the first connector M will be described with reference to FIGS. 1, 2, and 12 to 15.

The second connector N comprises a sliding sleeve 40 and a vibration damping assembly 50, which are connected in a torsion-free manner.

Figure 12:
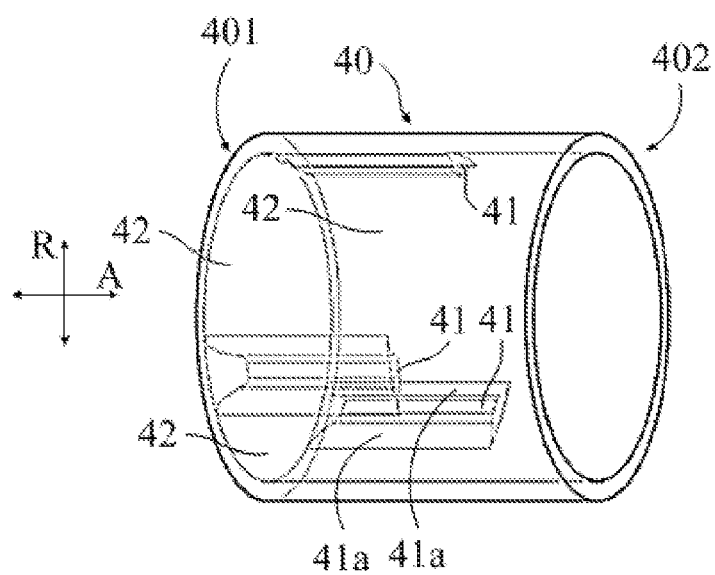
FIG. 12 is a structural schematic diagram of the sliding sleeve 40 in FIG. 1.

With reference to FIG. 1 (the double-dot dashed line in FIG. 1 indicates the sliding sleeve 40), FIG. 2, and FIG. 12, the sliding sleeve 40 has a substantially tubular shape. A first end 401 (a left end in FIG. 12) of the sliding sleeve 40 in the axial direction A is connected to the first connector M, and a second end 402 (a right end in FIG. 12) of the sliding sleeve 40 in the axial direction A is connected to the vibration damping assembly 50.

The inner cavity of the sliding sleeve 40 is formed at the first end 401 with three projecting ribs 41 uniformly distributed in the circumferential direction and projecting radially and inwardly, the projecting ribs 41 extending in the axial direction A so as to form a groove 42 between every two adjacent projecting ribs 41.

Two sides of each projecting rib 41 are each formed with a recessed cambered surface 41 in the circumferential direction, and each cambered surface 41*a* is abutted against by a row of balls 32 mounted on an arm 312, in other words, each projecting rib 41 is matched with a corresponding arm 312. The projecting rib 41 has a length in the axial direction A that is approximately equal to the length of the arm 312.

With reference to FIGS. 1 and 11, the protruding portion of the projecting rib 41 is provided relative to the arm recess 312*a*, and the balls 32 abut against cambered surfaces 41*a*; the arms 312 have some elasticity in the radial direction R, so when the first connector M is inserted into the sliding sleeve 40 from the first end 401 of the sliding sleeve 40, the hook portion 31*h* is pressed by the projecting rib 41 to be elastically deformed radially and inwardly and the first connector M continues to extend into the sliding sleeve 40 until the annular projections 311*a* abut against the end face of the sliding sleeve 40 at the first end 401, and at this point the first connector M is mounted in place. At this time, the hook portions 31*h* go just beyond the area covered by the projecting ribs 41 in the axial direction A and are ejected radially and outwardly, and therefore the arms 312 are restored to their original shape. Hook portions 31*h* hook the end face in the axial direction of the projecting ribs 41 away from the first end 401 such that the annular projections 311*a* and hook portions 31*h* define the position of the cage assembly 30 and the sliding sleeve 40 relative to each other on both ends of the axial direction A, respectively.

At this time, the raceway assemblies 20 are accommodated in the grooves 42, the raceway assemblies 20 are positioned in the circumferential direction by balls 32 and the balls 32 are positioned in the circumferential direction by cambered surfaces 41*a*, thereby realizing the mutual positioning of the first connector M and the second connector N in the circumferential direction.

Referring again to FIG. 12, the inner cavity of the sliding sleeve 40 does not have projecting ribs 41 in proximity to the second end 402, but forms a smooth cylindrical surface instead.

Preferably, the inner cavity of the sliding sleeve 40 of the above-described structure may be processed for example by machining the three projecting ribs penetrating the inner cavity of the sliding sleeve 40 in the axial direction A with the inner cavity using rotary swaging, and then removing part of the projecting ribs in proximity to the second end 402 by means of machining to form the projecting ribs 41 shown in FIG. 12.

With reference to FIGS. 1 and 2, the second end 402 of the sliding sleeve 40 is configured to mount the vibration damping assembly 50. The vibration damping assembly 50 comprises an adapter 51, a cup housing 52 and a buffer 53. The adapter 51 is connected to the sliding sleeve 40 in a torsion-free manner.

Figure 13:
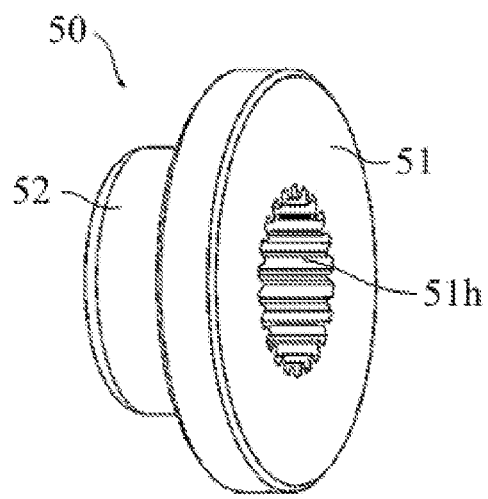
FIG. 13 is a structural schematic diagram of the vibration damping assembly 50 in FIG. 1.
Figure 14:
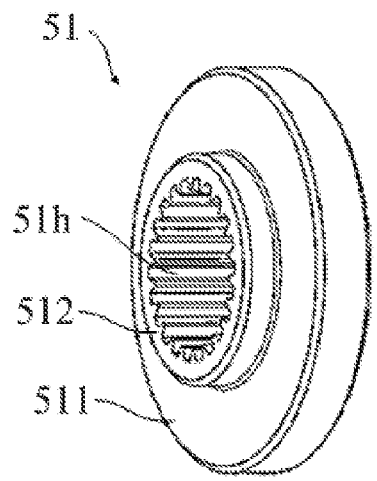
FIG. 14 is a structural schematic diagram of the adapter 51 in FIG. 13.

With reference to FIGS. 13 and 14, the adapter 51 comprises a main body 511 and a boss 512. The main body 511 is in the shape of a disk, the cylindrical boss 512 is convexly formed in the middle of the main body 511 facing the end face of the first end 401, and the boss 512 is configured to mount the cup housing 52. The middle portion of the adapter 51 is also provided with a splined hole 51*h*, which is configured to connect to the output shaft of the motor of the steering mechanism. For example, a male spline matched with the splined hole 51*h* is provided on the output shaft.

Preferably, the adapter 51 is made from an engineering plastic that has a suitable deformability. The adapter 51 is embedded in the inner cavity of the sliding sleeve 40, and the torsion-free connection between the adapter 51 and the sliding sleeve 40 is realized by interference fit between the main body 511 and the sliding sleeve 40; and when the splined hole 51*h* fits with the male spline, the splined hole 51*h* is slightly expanded by the male spline, thereby realizing a non-clearance fit between the adapter 51 and the male spline.

Figure 15:
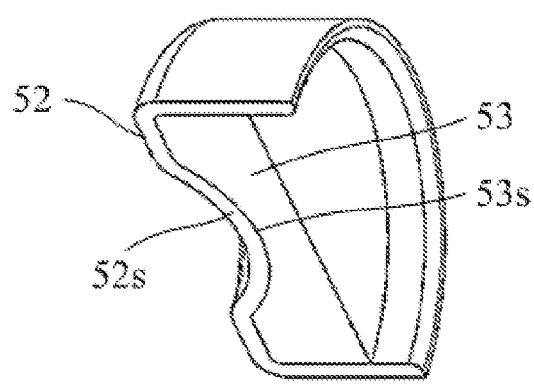
FIG. 15 is a cutaway schematic diagram of the cup housing 52 and the buffer 53 in FIG. 2.

With reference to FIGS. 2 and 15, the cup housing 52 is in the shape of a cup and is formed for example by stamping. The cup housing 52 is sleeved on the boss 512 of the adapter 51 and is capable of moving in a small range in the axial direction A relative to the boss 512 (it would be easier for the reader to understand this small range of movement when a gap G is described hereinafter). In the axial direction A, a buffer 53 is provided in the inner cavity of the cup housing 52, or rather between the cup housing 52 and the adapter 51. The buffer 53 is made for example from rubber, and the rubber buffer 53 is molded into the inner cavity of the cup housing 52, e.g., by a vulcanization process.

When the cup housing 52 is sleeved on the boss 512, in the initial state the boss 512 abuts against the buffer 53 but the cup housing 52 does not abut against the main body 511, that is, there is a gap G in the axial direction A between the cup housing 52 and the main body 511 (see FIG. 2). The buffer 53 can elastically deform in the axial direction A such that the shaft 11 can be displaced in the axial direction A relative to the adapter 51 within a small range.

The middle portion of the cup housing 52 facing the end face of the shaft 11 in the axial direction A is recessed to form a ball concave portion 52*s* in the shape of a spherical surface, and accordingly an elastic member closely abutting against the cup housing 52 also forms a ball concave portion 53*s* at a corresponding position. The ball concave portion 52*s* is configured to abut against the spherical surface 11*s* of the shaft 11. Preferably, the radius of the ball corresponding to the spherical surface 11*s* is slightly smaller than the radius of the ball corresponding to the ball concave portion 52*s*.

The spherical surface 11*s* abuts against the ball concave portion 52*s*, such that when the shaft 11 is offset relative to the axial direction A, the ball concave portion 52*s* can still achieve effective centering on the shaft 11.

Accordingly, when the first connector M and the second connector N are connected, in the axial direction A, as one connecting end of the coupling, the shaft 11 abuts against the cup housing 52 on one side, and is thereby limited relative to the second connector N, and the shaft 11 is limited by the raceway assemblies 20 connected to the shaft 11 (the raceway assemblies 20 are limited by the cage body 31 in the axial direction A) on the other side, and is thereby limited relative to the first connector M.

Referring again to FIGS. 1 and 2, the self-alignment and vibration damping capabilities of the coupling according to the present disclosure will be described. If the axial play of a self-aligning bearing located on one side of the worm is too small at the time when the steering mechanism reverses, the worm gear and worm shift from engagement in a static friction state to engagement in a dynamic friction state, which will cause a sudden rise and a sudden fall of friction torque. One way to avoid or mitigate this sudden rise or sudden fall of friction torque is to increase the axial play of the self-aligning bearing, thereby resulting in axial acceleration among parts of the bearing, and then the vibration caused by the axial acceleration can be absorbed by the coupling according to the present disclosure.

For example, when the axial acceleration generated by the self-aligning bearing is transmitted to the shaft 11, the shaft 11 abuts against the vibration damping assembly 50 so the shock of the shaft 11 on the cup housing 52 will be absorbed by the buffer 53.

In addition, the spacing between the teeth of the worm gear becomes larger as the worm gear gets worn under high torque, causing the worm engaged with the worm gear to vibrate and offset in all directions. The vibration can be absorbed by the coupling according to the present disclosure, and the offset can be adjusted by the coupling according to the present disclosure.

For example, when the axis of the shaft 11 is offset relative to the sliding sleeve 40 (this offset may be accompanied by axial displacement of the shaft 11 relative to the sliding sleeve 40 and/or deflection of the shaft 11 relative to the sliding sleeve 40 in the circumferential direction), the ball ring 13 presses the inner raceway 22 such that the spacing between the inner raceway 22 and the outer raceway 23 changes, and the vibration generated by the change in spacing can be absorbed by the elastic member 24. When the raceway assemblies 20 are offset relative to the cage assembly 30, the six rows of balls 32 on the cage assembly 30 roll relative to the curved surfaces 23a of six outer raceways located on the three raceway assemblies 20 such that a sudden rise and a sudden fall of friction are less likely to occur.

Finally, an assembly method for a three ball pin-type coupling according to the present disclosure is introduced as follows.

An inner raceway 22, an outer raceway 23 and an elastic member 24 are mounted to a raceway frame 21 to form a raceway assembly 20. Thereafter, three raceway assemblies 20 are mounted to a three shaft pin assembly 10 to form a three-pin universal swing module.

A cup housing 52 with a buffer 53 is connected to an adapter 51 to form a vibration damping assembly 50.

Balls 32 are mounted within ball pockets 31b of a cage body 31 to form a cage assembly 30.

The vibration damping assembly 50 is mounted to a sliding sleeve 40 by means of interference fit; then the cage assembly 30 drives the three-pin universal swing module into the sliding sleeve 40 in an axial direction A; and when a hook portion 31h and an annular projection 311a of the cage assembly 30 are fitted to the sliding sleeve 40 in place and the shaft 11 abuts against the cup housing 52, the assembly is completed.

It should be understood that the order of the execution of each sub-step of the above assembly can be adjusted.

Some of the beneficial effects of the above embodiments of the present disclosure are briefly described hereinafter.

(i) A first connector M of a three ball pin-type coupling according to the present disclosure uses a three shaft pin assembly 10, a ball ring 13 of the three shaft pin assembly 10 forms a spherical fit with an inner raceway 22 of a raceway assembly 20, and the raceway assembly 20 fits with a sliding sleeve 40 of a second connector N, thereby achieving universal swing of the first connector M relative to the second connector N. When an offset at a large angle (e.g., +/−1.5°) occurs between the first connector M and the second connector N, torque can still be transmitted between the first connector M and the second connector N. In other words, the offset angle of the worm can be dynamically compensated even under a high load for example when the worm gear made from plastics is severely worn and the axis of the worm is offset greatly.

(ii) The raceway assembly 20 has a non-linear wave-shaped spring 241 that has two sides flexibly fixing the inner raceway 22 and the outer raceway 23, and the three raceway assemblies 20 are arranged around the three shaft pin assembly 10, such that a non-clearance transmission between the first connector M and the second connector N can be realized in the circumferential direction. The elastic member 24 can compensate the tolerance, and this not only ensures the transmission stiffness but lowers the tolerance requirements for the production of related parts to improve the robustness of production, thereby avoiding reversing clearance and vibration shock by meeting the requirements for gapless torque transmission between transmission members.

(iii) A cage assembly 30 has floating balls 32, and the balls 32 form a linear raceway pair with the sliding sleeve 40 and the outer raceway 23, eliminating sudden rise and sudden fall of friction during transmission. Moreover, the processing and mounting of the balls 32 and a cage body 31 are technically easy to realize, as the balls 32 can be mounted to the cage body 31 first and then mounted into the inner cavity of the sliding sleeve 40 together with the cage body 31.

(iv) The second connector N of the three ball pin-type coupling according to the present disclosure comprises a vibration damping assembly 50 such that the transmission members are not subjected to axial vibration, and the requirement for controlling the axial clearance of the self-aligning bearing of the steering mechanism is lowered.

(v) The steering mechanism according to the present disclosure is not prone to experience reversing clearance and vibration shock as well as the system shock due to friction fluctuation during the process of reversing back and forth and continuously starting and stopping.

It should be understood that the foregoing embodiments are only exemplary and are not intended to limit the present disclosure. Those skilled in the art can make various modifications and changes to the foregoing embodiments under the teaching of the present disclosure without departing from the scope of the present disclosure. For example, (i) the adapter 51 may not be an insert embedded in the sliding sleeve 40, but may be connected to the sliding sleeve 40 by for example a screw connection, a threaded connection, or fusion welding;

(ii) the three-pin joint 12 may also be integrally formed with the shaft 11;

(iii) the raceway frame 21 may be in other frame shapes and will not be limited herein; and (iv) the two wave-shaped springs 241 of the same raceway assembly 20 may not be connected by the connecting portion 242, thereby forming two independent elastic members.

LIST OF REFERENCE NUMERALS

M. First connector;
N. Second connector;
10. Three shaft pin assembly;
11. Shaft;
11s. Spherical surface;
11h. Pin hole;
12. Three-pin joint;
12n. Journal;
13. Ball ring;

20. Raceway assembly;
20s. Ball ring mounting portion;
21. Raceway frame;
211. Side frame;
211a. Pocket edge;
212. Connecting rod;
22. Inner raceway;
22s. Spherical concave surface;
23. Outer raceway;
23a. Curved surface;
24. Elastic member;
241. Wave-shaped spring;
242. Connecting portion;
30. Cage assembly;
31. Cage body;
311. Annular portion;
311a. Annular projection;
312. Arm;
312a. Arm recess;
31b. Ball pocket;
31h. Hook portion;
32. Ball;
40. Sliding sleeve;
401. First end;
402. Second end;
41. Projecting rib;
41a. Cambered surface;
42. Groove;
50. Vibration damping assembly;
51. Adapter;
511. Main body;
512. Boss;
51h. Splined hole;
52. Cup housing;
52s. Ball concave portion;
53. Buffer;
53s. Ball concave portion;
A. Axial direction;
R. Radial direction;
G. Gap.

The invention claimed is:

1. A three ball pin-type coupling, comprising:
a first connector and a second connector which are non-rotatably connected;
the first connector comprises a three shaft pin assembly, three raceway assemblies and a cage assembly;
the three shaft pin assembly comprises a shaft and three ball rings which surround the shaft and are arranged at intervals in a circumferential direction of the shaft;
each said ball ring is connected to one of the raceway assemblies; the cage assembly defines a position of the raceway assemblies in the circumferential direction;
the raceway assemblies are configured to provide an elastic force between the ball ring and the cage assembly; and
when the ball ring displaces relative to the cage assembly in the circumferential direction, two sides of the raceway assembly in the circumferential direction remain abutted against the cage assembly.

2. The three ball pin-type coupling according to claim 1, wherein the raceway assemblies further comprise raceway frames, inner raceways, outer raceways and an elastic member;
each of the raceway frames is provided with two of the inner raceways and two of the outer raceways;
two of the inner raceways are spaced apart to form a ball ring mounting portion therebetween;
one of the outer raceways is mounted on a side of each of the inner raceways away from the ball ring mounting portion;
one of the inner raceways and one of the outer raceways located on a same side of the ball ring mounting portion form a raceway pair;
the elastic member is at least partially provided between the inner raceway and the outer raceway; and
the elastic member abuts against the inner raceway and the outer raceway of each of the raceway pairs.

3. The three ball pin-type coupling according to claim 2, wherein when the ball ring is located in a middle of two of the outer raceways, the elastic member is squeezed by the inner raceway and the outer raceway and is deformed elastically thereby.

4. The three ball pin-type coupling according to claim 2, wherein during elastic deformation of the elastic member, a stiffness coefficient of the elastic member changes.

5. The three ball pin-type coupling according to claim 4, wherein a portion of the elastic member between the inner raceway and the outer raceway is at least partially in a wave shape.

6. The three ball pin-type coupling according to claim 5, wherein the elastic member is U-shaped and comprises a connecting portion and two wave-shaped springs connected with two ends of the connecting portion; and
the two of the wave-shaped springs are inserted between the inner raceway and the outer raceway of one of the raceway pairs, respectively.

7. The three ball pin-type coupling according to claim 2, wherein a side of the inner raceway facing the ball ring mounting portion is partially recessed to form a spherical concave surface which is part of a spherical surface and is in contact with the ball ring.

8. The three ball pin-type coupling according to claim 2, wherein a side of the outer raceway facing away from the ball ring mounting portion is partially recessed to form a curved surface in contact with the cage assembly.

9. The three ball pin-type coupling according to claim 1, wherein the cage assembly comprises a cage body and balls;
the cage body comprises an annular portion and three arms connected with the annular portion;
the arms extend along an axial direction of the annular portion;
two sides of the arms in the circumferential direction are formed with several notched ball pockets;
the balls are accommodated in the ball pockets and are capable of rolling relative to the ball pockets within the ball pockets;
each of the arms is inserted between two of the raceway assemblies; and
the balls abut against the raceway assemblies.

10. The three ball pin-type coupling according to claim 9, wherein a middle portion of each of the arms, located between two rows of the ball pockets in the circumferential direction, is recessed radially and inwardly to form an arm recess.

11. The three ball pin-type coupling according to claim 9, wherein the second connector comprises a tubular sliding sleeve having a first end in the axial direction connected to the first connector;
an inner cavity of the sliding sleeve comprises three projecting ribs in the axial direction near the first end projecting radially and inwardly and spaced apart in the circumferential direction;

the projecting ribs extend in the axial direction to form a groove between every two adjacent ones of the projecting ribs;

the arms are aligned with the projecting ribs in the circumferential direction;

the balls abut against the projecting ribs; and each of the raceway assemblies is received in one of the grooves.

12. The three ball pin-type coupling according to claim 11, wherein two sides of each of the projecting ribs in the circumferential direction are each formed with a recessed cambered surface, and the balls abut against the cambered surfaces.

13. The three ball pin-type coupling according to claim 11, further comprising a hook portion projecting outwardly in a radial direction of the annular portion formed at an end of the arm away from the annular portion, and the hook portion hooks the projecting rib to prevent the cage assembly from disengaging from the first end.

14. The three ball pin-type coupling according to claim 11, wherein an outer circumferential portion of the annular portion comprises several annular projections projecting radially and outwardly, and the annular projections abut against an end face of the sliding sleeve at the first end to limit the cage assembly in the axial direction.

15. The three ball pin-type coupling according to claim 11, wherein the inner cavity of the sliding sleeve does not have the projecting ribs at a second end away from the first end in the axial direction;

the second connector further comprises a vibration damping assembly mounted on the second end non-rotatably relative to the sliding sleeve;

the vibration damping assembly extends at least partially into the inner cavity of the sliding sleeve;

the shaft abuts against the vibration damping assembly, an axial end of the shaft closer to the vibration damping assembly forms a spherical surface; and a portion of the vibration damping assembly that is in contact with the shaft is shaped as a spherical surface.

16. The three ball pin-type coupling according to claim 15, wherein the vibration damping assembly further comprises an adapter, a cup housing and a buffer;

the adapter and the sliding sleeve are non-rotatably connected to one another;

the cup housing is connected to the adapter;

the buffer is provided between the cup housing and the adapter;

a portion of the shaft that is in contact with the vibration damping assembly is located at the cup housing; and a portion of the cup housing that is in contact with the shaft forms a recessed ball concave portion having a spherical surface.

17. The three ball pin-type coupling according to claim 16, wherein an inner circumferential portion of the adapter forms a splined hole.

18. The three ball pin-type coupling according to claim 16, wherein the adapter is embedded in the inner cavity of the sliding sleeve;

a middle portion of an end face of the adapter facing the shaft forms a boss by projecting towards the shaft; and the cup housing is sleeved on the boss such that the cup housing is axially movable relative to the boss.

19. The three ball pin-type coupling according to claim 18, wherein when the buffer is not compressed, there is a gap between the cup housing and the end face of the adapter facing the shaft.

20. A steering mechanism, comprising:

a motor;

a coupling;

a worm gear and worm assembly;

the coupling comprises the three ball pin-type coupling according to claim 1;

the first connector of the three ball pin-type coupling and a worm of the worm gear and worm assembly are non-rotatably connected; and the second connector of the three ball pin-type coupling and an output shaft of the motor are non-rotatably connected.

* * * * *